United States Patent
Leon, Jr.

(10) Patent No.: US 6,279,885 B1
(45) Date of Patent: Aug. 28, 2001

(54) MAGNETIC CLAMP FOR WELDING MAGNETIC OBJECTS

(76) Inventor: Raymond Leon, Jr., 45-625 Citrus Ave., Suite C, Indio, CA (US) 92201

( * ) Notice: Subject to any disclaimer, the term of this patent is extended or adjusted under 35 U.S.C. 154(b) by 0 days.

(21) Appl. No.: 09/657,739

(22) Filed: Sep. 8, 2000

(51) Int. Cl.[7] ....................................... B25B 1/00
(52) U.S. Cl. .......................... 269/8; 269/254 CS; 269/6; 269/239; 269/268; 269/901; 269/902
(58) Field of Search ............................. 269/8, 6, 254 CS, 269/3, 156, 239, 902, 268, 901

(56) References Cited

U.S. PATENT DOCUMENTS

| | | | | |
|---|---|---|---|---|
| 2,884,698 | * | 5/1959 | Wursch | 269/8 |
| 5,135,206 | * | 8/1992 | Martinez | 269/21 |
| 5,201,501 | * | 4/1993 | Fassier | 269/32 |
| 5,820,116 | * | 10/1998 | Haese | 269/21 |
| 5,971,379 | * | 10/1999 | Leon, Jr. | 269/8 |
| 6,092,271 | * | 7/2000 | Stojkovic et al. | 269/8 |

* cited by examiner

Primary Examiner—Eileen P. Morgan
Assistant Examiner—Lee Wilson
(74) Attorney, Agent, or Firm—Timothy Thut Tyson; Ted Masters; Freilich, Hornbaker & Rosen

(57) ABSTRACT

A magnetic clamp (20) for welding a magnetic object (504), includes a first magnetic member (22) and a second magnetic member (24). A hinge (26) connects magnetic members (22) and (24) so that an angle formed by magnetic members (22) and (24) may be changed. A spring loaded terminal (500) having a contact end (502) is disposed between first magnetic member (22) and second magnetic member (24). Magnetic clamp (20) may be attached to magnetic object (504) so that first magnetic member (22), second magnetic member (24), and contact end (502) all abut magnetic object (504). In a preferred embodiment, a removal tab (36) is connected to magnetic clamp (20) to assist in removing magnetic clamp (20) from magnetic object (504).

8 Claims, 8 Drawing Sheets

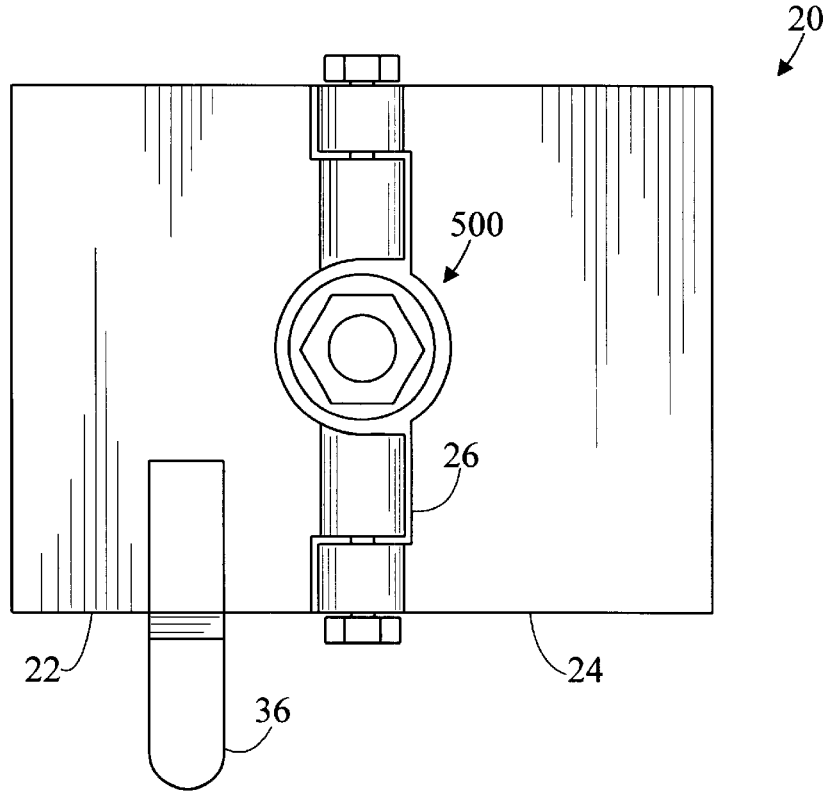
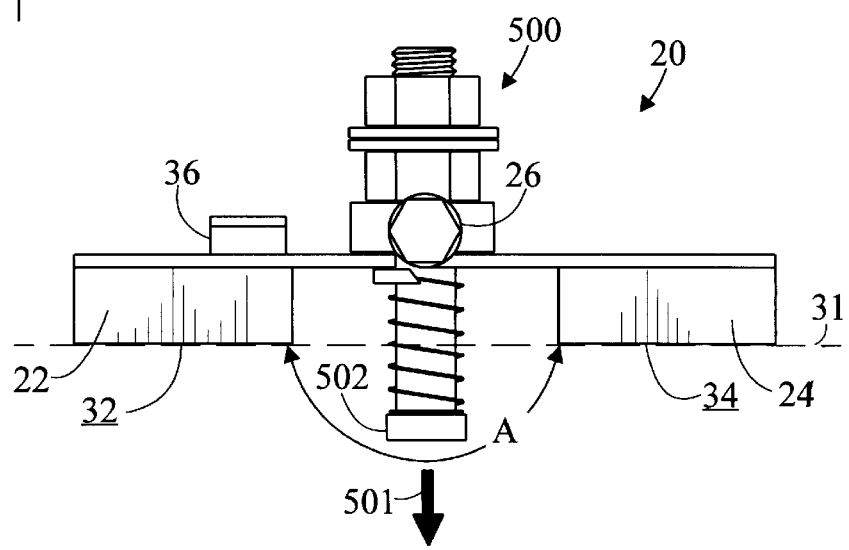

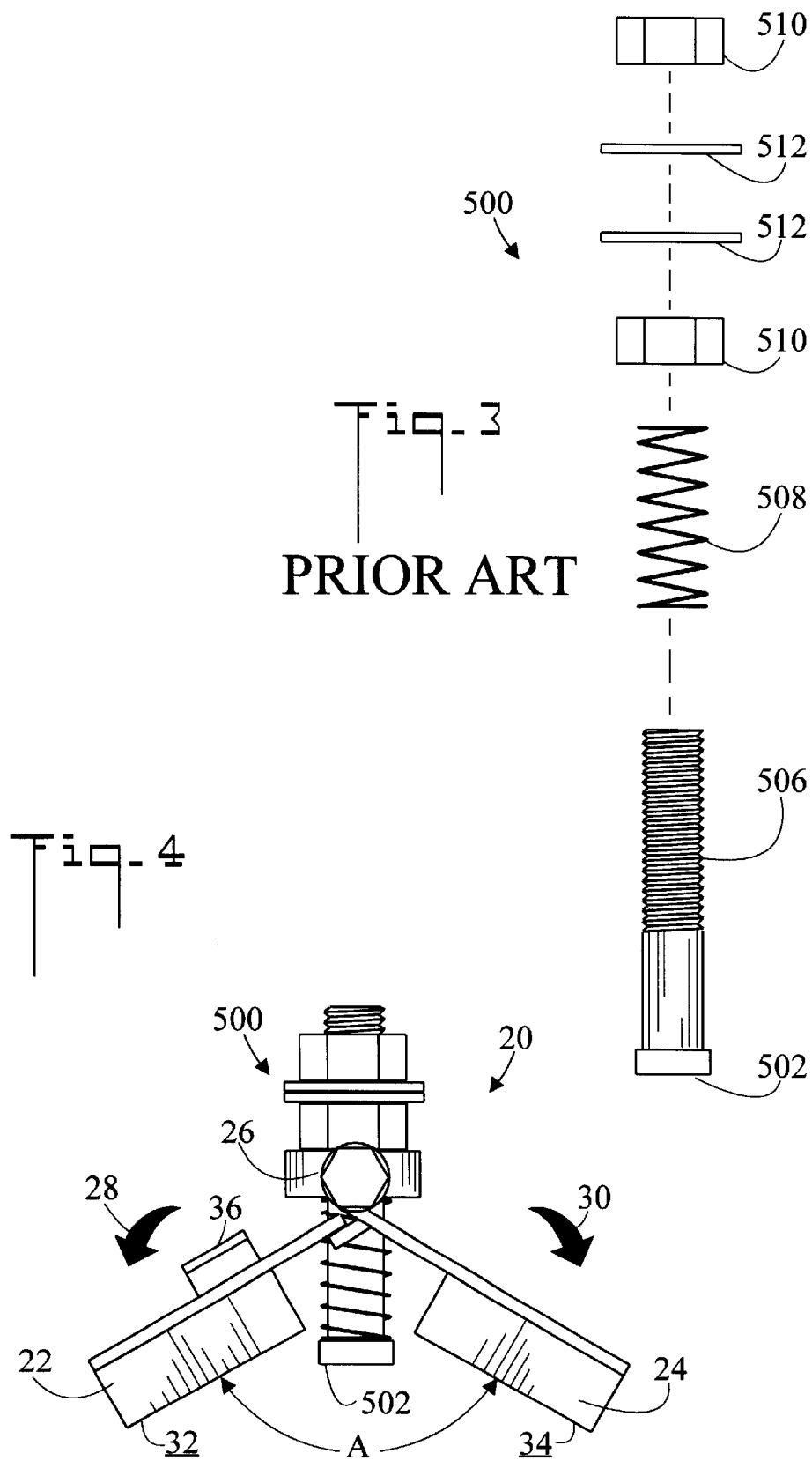

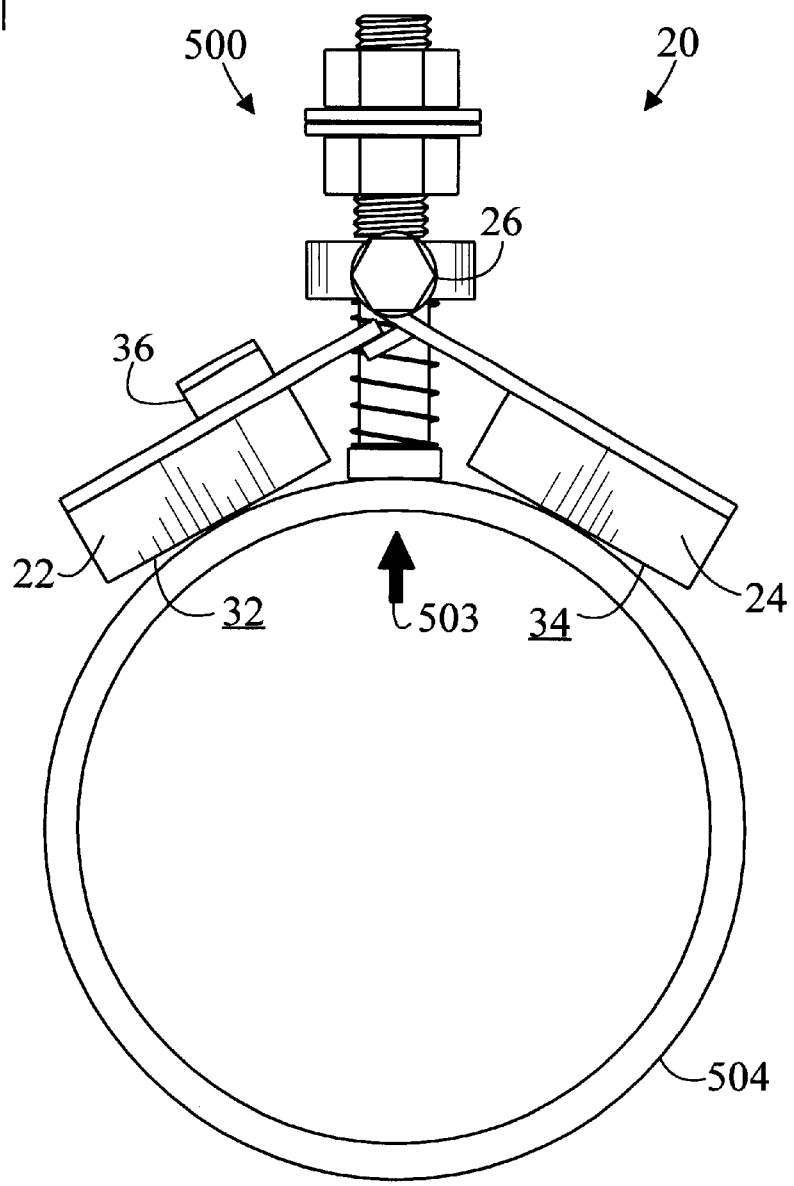

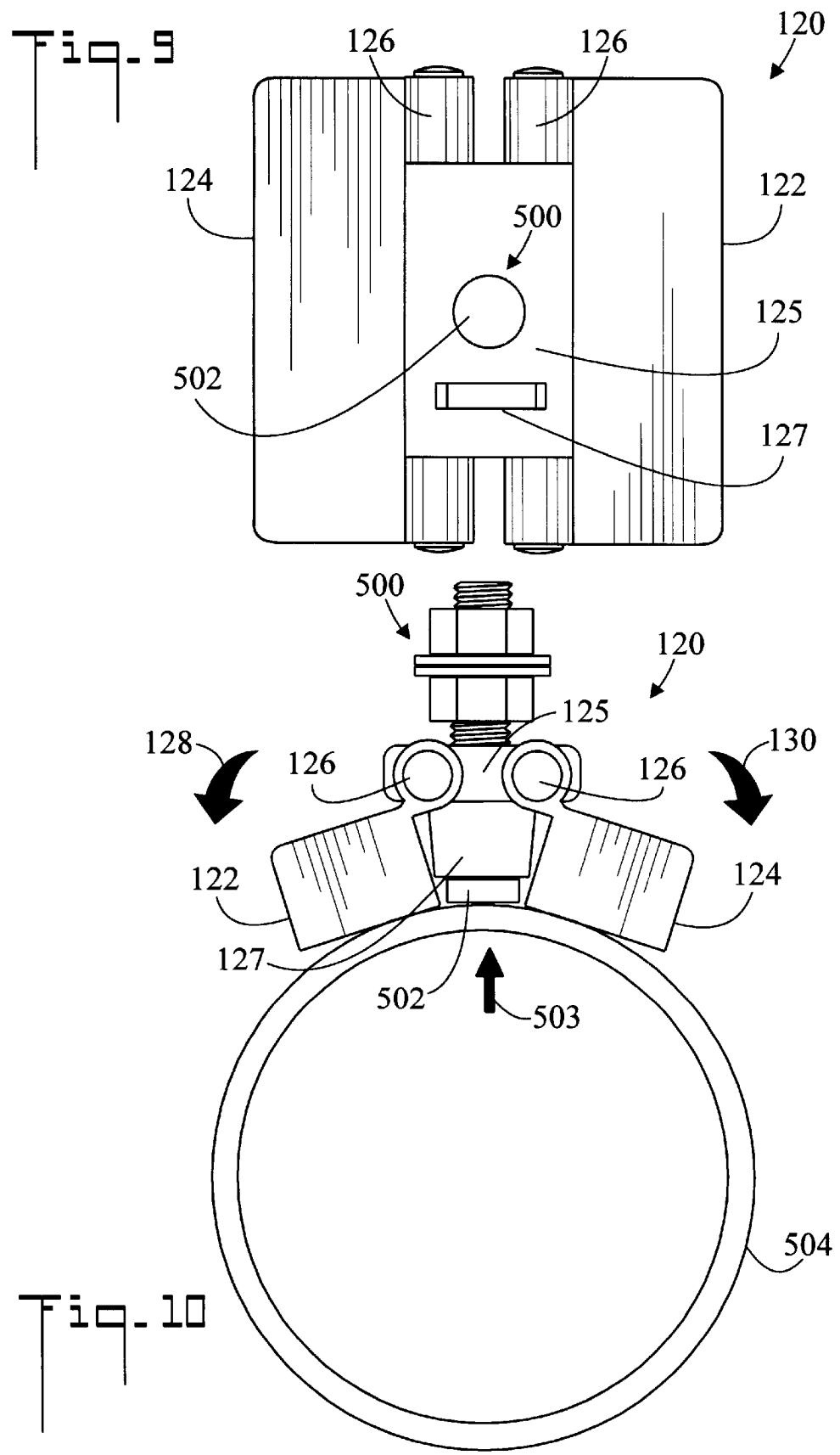

MAGNETIC CLAMP FOR WELDING MAGNETIC OBJECTS

TECHNICAL FIELD

The present invention pertains generally to welding, and in particular to a magnetic welding clamp that is attached to magnetic objects to provide a ground during arc welding.

BACKGROUND ART

When arc welding, it is necessary to attach a ground to the object being welded while the other pole of the electric circuit is the welding rod. When the electricity passes through the welding rod to the object, it melts the tip of the welding rod thereby depositing molten metal on the object.

Usually a spring clamp is used to connect the ground cable from the welding apparatus to the object. Nuts on the top of the clamps are used to attach the lug of the ground cable to the clamps. In one common embodiment, a spring loaded terminal (refer to FIG. 3) is attached to a flat magnetic clamp. The spring loaded terminal has a bolt that passes through the middle of the magnet and abuts the object to be welded. In this fashion, the electric current does not pass through the magnet, but rather is shunted directly through the bolt.

DISCLOSURE OF INVENTION

The present invention is directed to a magnetic clamp having two cooperating magnetic members for use in arc welding a magnetic workpiece object. The present invention is particularly useful when welding pipes since a single flat magnet does not stay on a pipe very well because the contact area is limited to a straight line allowing the single magnet to be twisted off. By having two magnets at an angle to each other, the holding power is increased and the clamp of the present invention cannot easily be twisted off of the pipe.

The two magnets can either be held rigidly at an angle to each other or hinged to each other. In the middle of the two magnets is a spring loaded terminal which attaches to a welding cable lug on the top and touches the pipe on the bottom. If the two magnets are rigidly at an angle to each other, a problem arises in that the length of the bolt into the "V" of the clamp must be adjusted to just touch the pipe. If it is too long, it will hold one side of the magnets off of the pipe. If it is too short, it will not make contact with the pipe. Each different pipe diameter requires the length of the terminal to be readjusted. A solution to this problem is to create a two sided magnetic clamp which has hinges in the middle, thereby permitting the clamp to automatically adjust to different pipe diameters and be used on flat objects. The two sides rotate around the hinge pin to match the diameters of various pipes with no adjustment of the bolt length being required to touch the pipe as in the rigid "V" shaped clamp.

In accordance with a preferred embodiment of the invention, a magnetic clamp for welding a magnetic object includes two flat magnetic members connected by a hinge so that the angle formed by the two magnetic members can be varied. A spring loaded terminal having a contact end is disposed between the two magnetic members, so that the clamp may be attached to a magnetic object with the first magnetic member, the second magnetic member, and the contact end all abutting the magnetic object.

In accordance with an important aspect of the invention, each of the two magnetic members have a substantially flat bottom surface, so that both bottom surfaces can be adjusted to abut a substantially flat magnetic object.

In accordance with an important feature of the invention, two hinges are utilized to connect the two magnetic members.

In accordance with another preferred embodiment of the invention, the magnetic clamp includes a removal tab for removing the magnetic clamp from the magnetic object.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a top plan view of a magnetic clamp for welding magnetic objects in accordance with the present invention;

FIG. 2 is an end elevation view of the magnetic clamp;

FIG. 3 is an exploded side elevation view of a prior art spring loaded terminal;

FIG. 4 is an end elevation view of the magnetic clamp with the two magnetic members rotated about a hinge;

FIG. 5 is an end elevation view of the magnetic clamp installed upon a magnetic object;

FIG. 9 is a bottom plan view of the magnetic clamp of FIG. 7;

FIG. 10 is an end elevation view of the magnetic clamp of FIG. 7 installed on a pipe;

MODES FOR CARRYING OUT THE INVENTION

Figure 6:
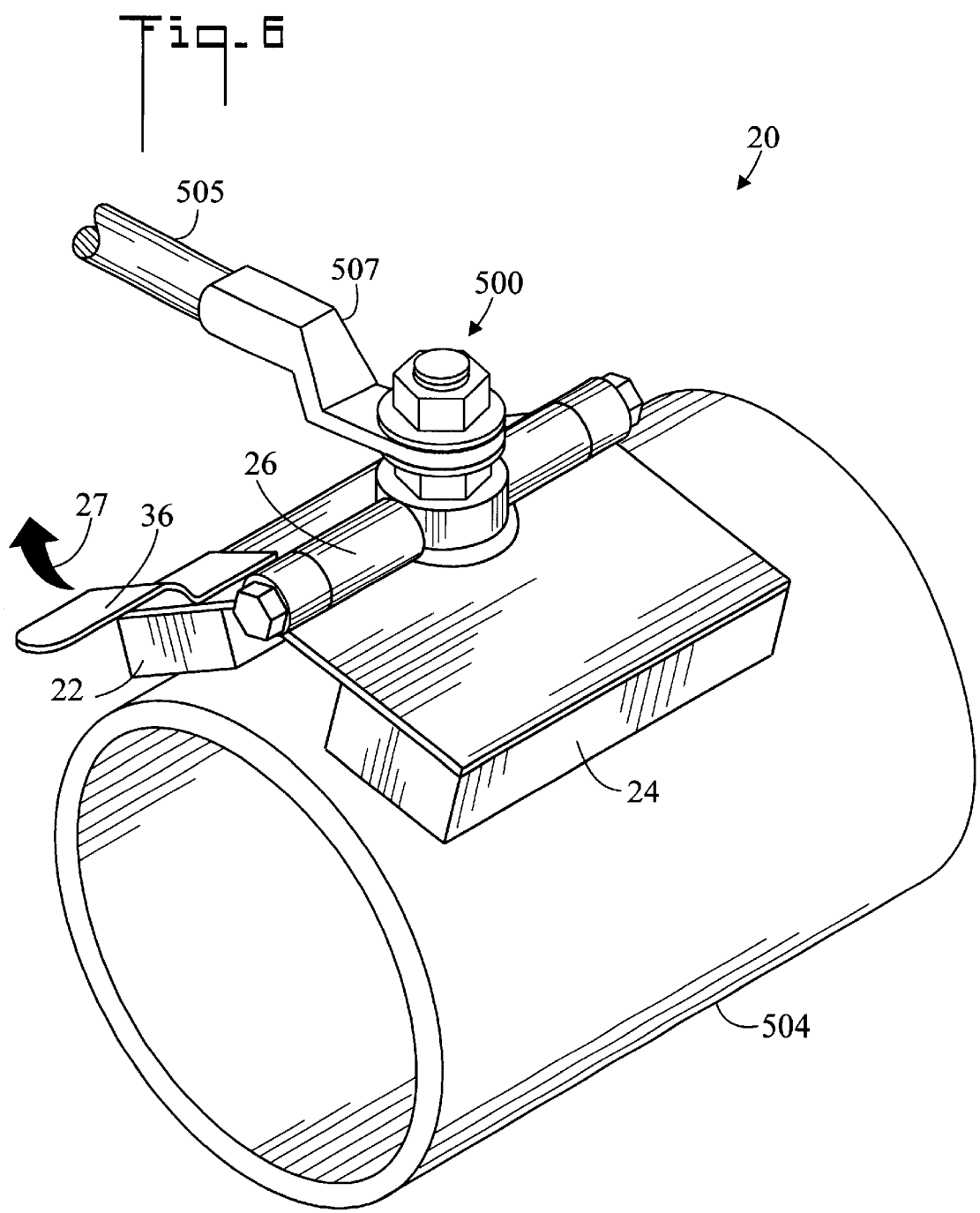
FIG. 6 is a perspective view of the magnetic clamp installed on a pipe.
Figure 7:
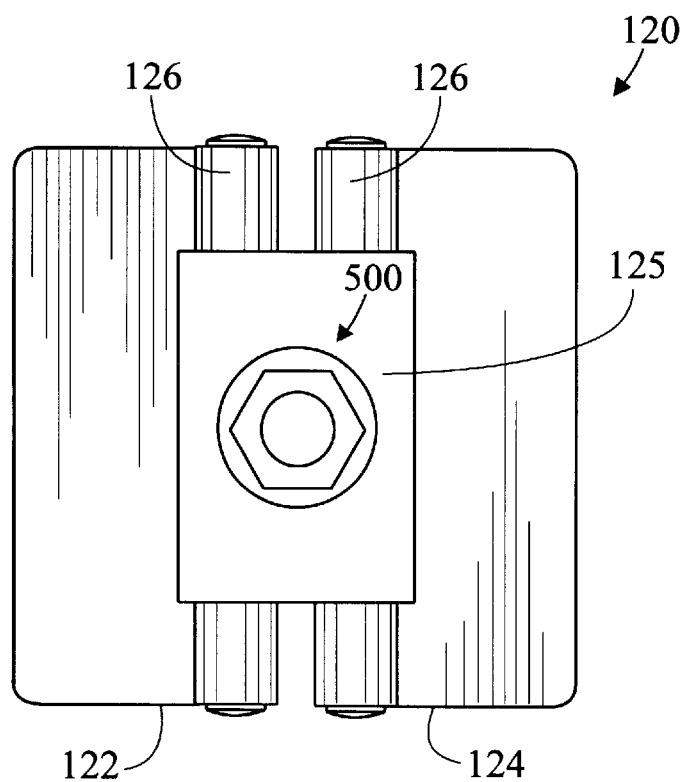
FIG. 7 is a top plan view of a second embodiment of the magnetic clamp having two hinges.
Figure 8:
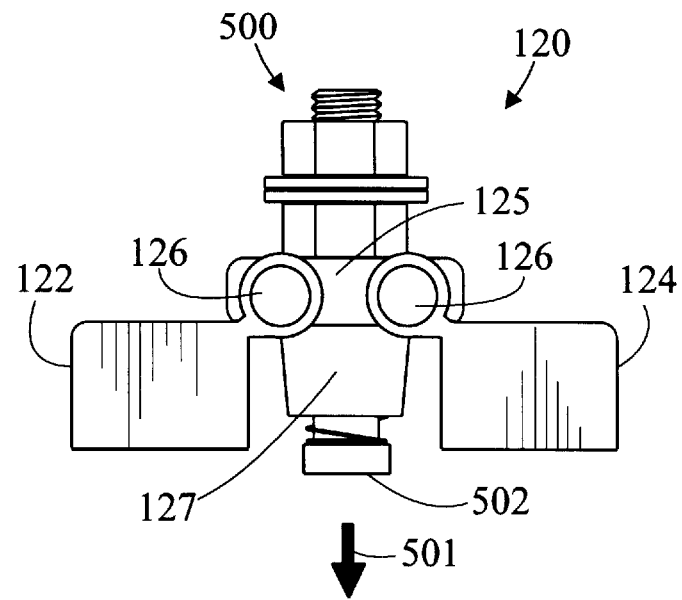
FIG. 8 is an end elevation view of the magnetic clamp of FIG. 7.

Referring to FIGS. 1, 2, 4, 5, and 6, there are illustrated top plan, end elevation, rotated end elevation, end elevation installed upon a magnetic object, and installed perspective views respectively of a magnetic clamp for welding magnetic objects in accordance with the present invention, generally designated as 20. Magnetic clamp 20 includes a first magnetic member 22 and a second magnetic member 24. A hinge 26 connects first magnetic member 22 to second magnetic member 24 so that an angle A formed by first magnetic member 22 and second magnetic member 24 is variable (also refer to FIG. 4). In FIG. 2 angle A is substantially flat or 180°, and in FIG. 4 first magnetic member 22 and second magnetic member 24 have been rotated in directions 28 and 30 to form an angle A of about 120°. A spring loaded terminal 500 (also refer to FIG. 3) is disposed between first magnetic member 22 and second magnetic member 24. Spring loaded terminal 500 has a contact end 502 which is spring biased in direction 501. In FIG. 5, magnetic clamp 20 is attached to a magnetic object 504 such as a pipe, so that first magnetic member 22, second magnetic member 24, and contact end 502 of spring loaded terminal 500 all abut magnetic object 504. Contact end 502 of spring loaded terminal has been urged in direction 503.

First 22 and second 24 magnetic members each having a substantially planar surface, 32 and 34 respectively, for abutting magnetic object 504. Angle A is adjustable so that planer surfaces 32 and 34 reside in a substantially common plane 31 (refer to FIG. 2).

Magnetic clamp 20 also includes a removal tab 36 for removing magnetic clamp 20 from magnetic object 504.

Removal tab 36 is connected to any convenient location on magnetic clamp 20, for example to first magnetic member 22 (shown), to second magnetic member 24, or to hinge 26. Removal tab 36 provides a user with a handle which may be lifted or pried up in direction 27 to overcoming the strong attraction of first magnetic member 22 and second magnetic member 24. In FIG. 6, welding cable 505 and cable lug 507 are shown attached to spring loaded terminal 500.

Referring to FIG. 3, there is illustrated an exploded side elevation view of prior art spring loaded terminal 500. Spring loaded terminal 500 includes a bolt 506 having a contact end 502, spring 508, nuts 510, and washers 512.

Referring to FIGS. 7–10, there are illustrated top plan, end elevation, bottom plan, and installed end elevation views respectively of a second embodiment of the magnetic clamp, generally designated as 120. Similar to clamp 20, clamp 120 includes a first magnetic member 122, a cooperating second magnetic member 124, and a spring loaded terminal 500 disposed between the two. Two hinges 126 connect first magnetic member 122 and second magnetic member 124. A central portion 125 is disposed between the two hinges 126, and spring loaded terminal 500 is connected to central portion 125. A tapered stop 127 is connected to central portion 125. Stop 127 prevents first 122 and second 124 magnetic members from abutting spring loaded terminal 500. In FIG. 10, clamp 120 has been installed on pipe 504 with first magnetic member 122 and second magnetic member 124 rotated in directions 128 and 130 respectively to abut pipe 504. Contact end 502 of spring loaded terminal 500 has been urged in direction 503.

Figure 11:
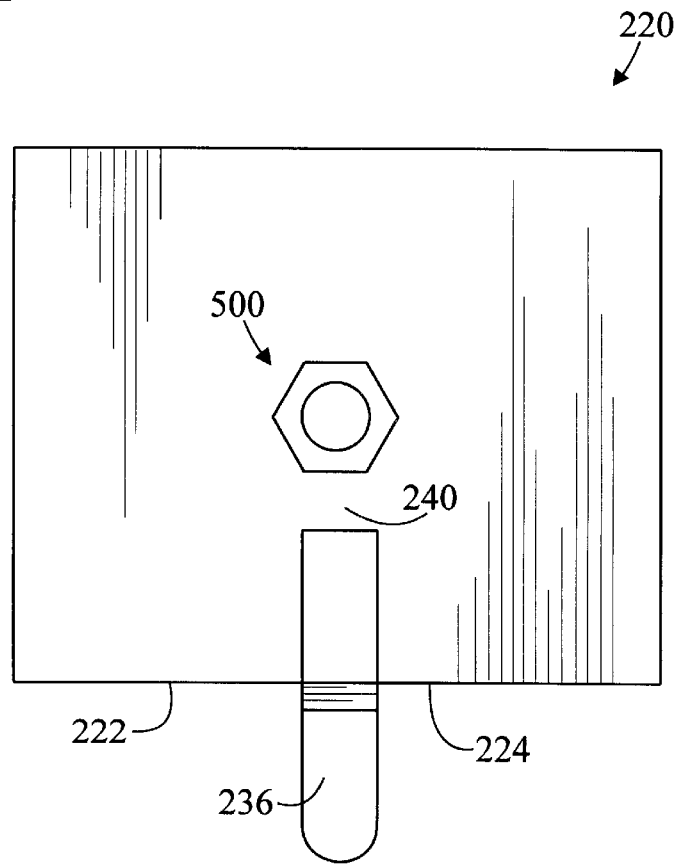
FIG. 11 is a top plan view of a third hingeless embodiment of the magnetic clamp.
Figure 12:
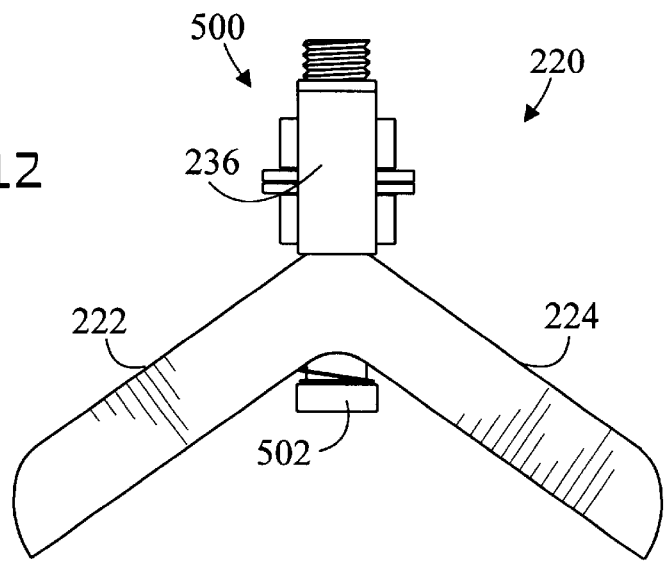
FIG. 12 is an end elevation view of the magnetic clamp of FIG. 11.
Figure 13:
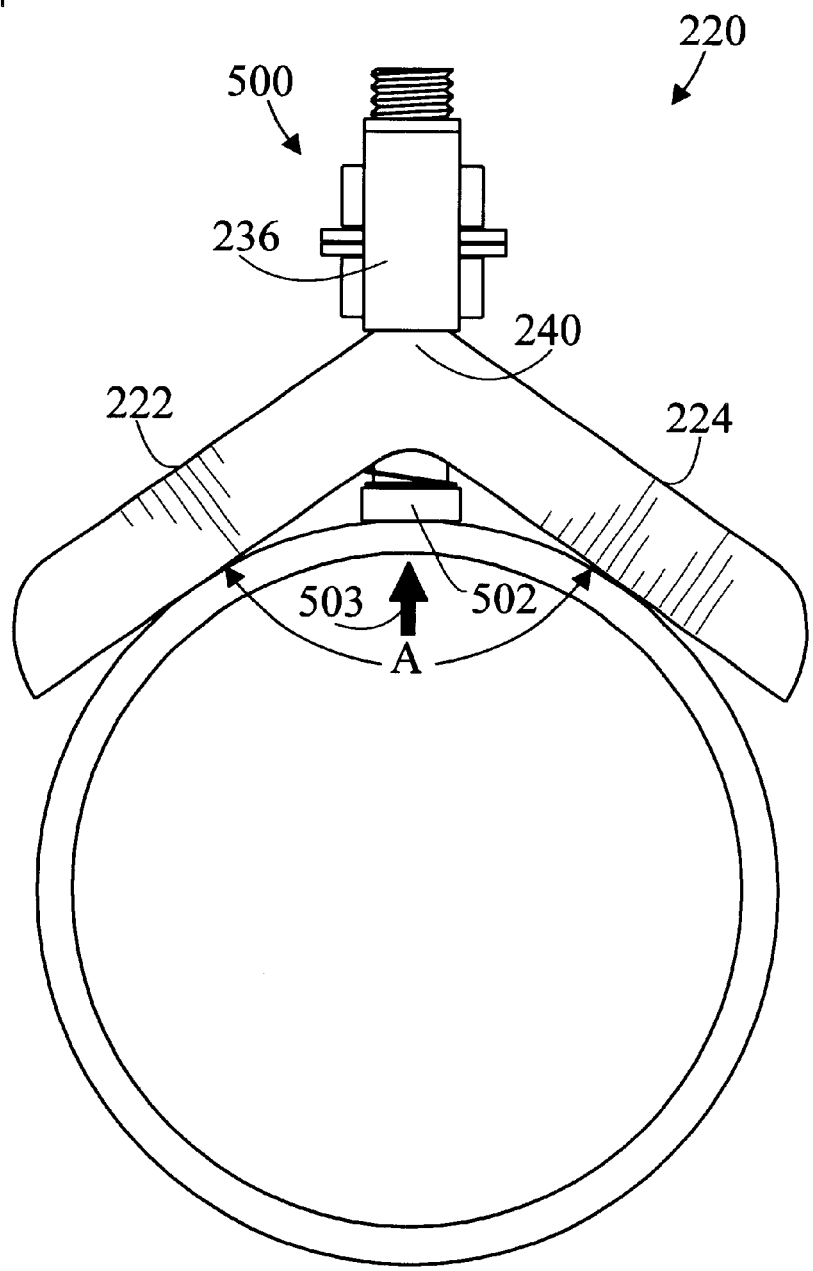
FIG. 13 is an end elevation view of the magnetic clamp of FIG. 11 installed on a pipe.

Referring to FIGS. 11–13, there are illustrated top plan, end elevation, and installed end elevation views respectively of a third embodiment of the magnetic clamp, generally designated as 220. Clamp 220 includes a first magnetic member 222, and a second magnetic member 224 connected to first magnetic member 222 so that first 222 and second 224 magnetic members form an angle A therebetween. A spring loaded terminal 500 having a contact end 502 is disposed between first magnet member 222 and second magnetic member 224. In FIG. 13, magnetic clamp 220 is attached to magnetic object 504 wherein first magnetic member 222, second magnetic member 224, and contact end 502 all abut magnetic object 504. Removal tab 236 is connected to first magnetic member 222, second magnetic member 224, or junction 240 between the two magnetic members.

It is noted that in all embodiments of the present invention, spring loaded terminal 500 does not contact the magnetic members. This is so that current does not flow through the magnetic members and reduce their magnetism. Also, in a preferred embodiment the magnetic members comprise a magnet which is surrounded by a housing. A cover is provided to completely seal the magnet within the housing so that magnetic metal debris, such as shavings, cannot contact the magnet, or become lodged in spaces between the magnet and the housing.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A magnetic clamp for welding a magnetic object, comprising:

a first magnetic member;

a second magnetic member;

a hinge connecting said first magnetic member to said second magnetic member so that an angle formed by said first magnetic member and said second magnetic member is variable;

a spring loaded terminal disposed between said first magnetic member and said second magnetic member, said spring loaded terminal having a contact end; and, so that said magnetic clamp may be attached to the magnetic object wherein said first magnetic member, said second magnetic member, and said contact end all abut the magnetic object.

2. A magnetic clamp according to claim 1, further including:

said first and second magnetic members each having a substantially planar surface for abutting the magnetic object.

3. A magnetic clamp according to claim 2, further including:

said angle adjustable so that said planer surfaces of said first and second magnetic members reside in a substantially common plane.

4. A magnetic clamp according to claim 1, further including:

a removal tab for removing said magnetic clamp from said magnetic object, said removal tab connected to one of said first magnetic member, said second magnetic member, and said hinge.

5. A magnetic clamp according to claim 1, further including:

said first and second magnetic members each having a substantially planar surface for abutting the magnetic object;

said angle adjustable so that said planer surfaces of said first and second magnetic members reside in a common plane; and, a removal tab for removing said magnetic clamp from said magnetic object, said removal tab connected to one of said first magnetic member, said second magnetic member, and said hinge.

6. A magnetic clamp according to claim 1, further including:

two hinges connecting said first and second magnetic members.

7. A magnetic clamp according to claim 4, further including:

a central portion disposed between said two hinges;

said spring loaded terminal connected to said central portion; and, a stop connected to said central portion, said stop preventing said first and second magnetic members from abutting said spring loaded terminal.

8. A magnetic clamp according to claim 1, further including:

said first and second magnetic members each having a substantially planar surface for abutting the magnetic object;

said angle adjustable so that said planer surfaces of said first and second magnetic members reside in a common plane;

two hinges connecting said first and second magnetic members;

a central portion disposed between said two hinges;

said spring loaded terminal connected to said central portion; and, a stop connected to said central portion, said stop preventing said first and second magnetic members from abutting said spring loaded terminal.

* * * * *